Oct. 14, 1941.                M. INGWER                 2,259,249
FURRIER'S KNIFE
Filed March 22, 1941
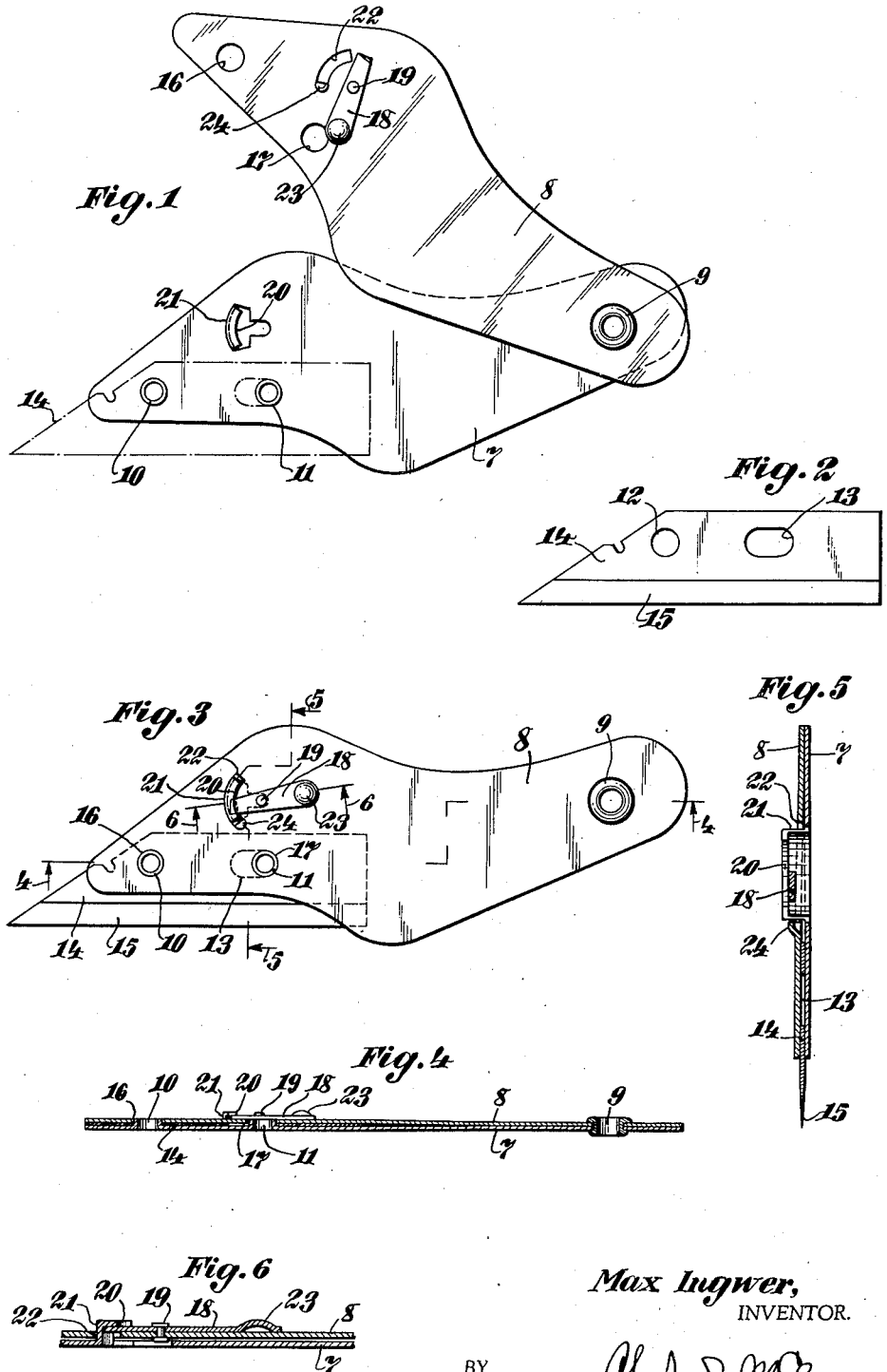
Max Ingwer,
INVENTOR.

Patented Oct. 14, 1941

2,259,249

UNITED STATES PATENT OFFICE 2,259,249

FURRIER'S KNIFE

Max Ingwer, Forest Hills, N. Y., assignor to Consolidated Sewing Machine & Supply Co. Inc., New York, N. Y., a corporation of New York Application March 22, 1941, Serial No. 384,657

8 Claims. (Cl. 30—331)

The present invention relates to furriers' knives and special objects of the invention are to improve the handle and blade securing portions, particularly in the way of making it easier and safer to remove and replace the blades, to compensate for variations in size or thickness of parts, so as to at all times, firmly secure and lock the blade in the holder; to simplify structure and reduce cost of manufacture and in general, to provide a better and more practical knife of the character mentioned than those now available on the market.

The foregoing and other desirable objects are attained by certain novel features of construction, combination and relation of parts, all as hereinafter defined, broadly covered in the claims and illustrated by way of practical example in the accompanying drawing.

In the drawing, one commercial embodiment of the invention is shown, but it will be understood that structure may be modified and changed as regards this particular disclosure, all within the true intent and broad scope of the invention, as hereinafter described and claimed.

Fig. 1 is a face view of the holder or handle construction as opened up to receive the blade, the outline of the latter being indicated in broken lines.

Fig. 2 is a face view of one form of blade suitable for use in the holder.

Fig. 3 is a view of the handle closed with the blade secured in operative position.

Figs. 4, 5 and 6 are sectional views as on substantially the planes of lines 4—4, 5—5 and 6—6 respectively, Figs. 5 and 6 being on an enlarged scale and Fig. 6 being broken away.

The holder portion of the device consists of a pair of fairly thin sheet metal plates 7, 8, more or less shaped to fit in the grasp of the hand and pivotally connected together at the back or rearward end as by a tubular rivet 9.

One handle plate or section 7, is shown as having two integral spaced tubular bushings 10, 11, struck upward from the inner face, near the lower forward edge of the same.

The spacing and location of these tubular integral protrusions 10, 11, is such as to properly fit the openings 12, 13, in blades 14, and to then locate said blades as indicated, with the cutting edge 15, exposed and extending forwardly at the lower and forward edge of the handle.

The second handle plate is shown formed with openings 16, 17, of a size and spacing to fit over the ends of the hollow studs and thus to confine the blades thereon as particularly appears in Figs. 3 and 4. As will be clear from the latter figure, this provides a particularly thin structure, substantially the thickness only of the two handle sections, plus that of the interposed blade, the ends of the hollow blade locating and holding studs being substantially flush with the outer face of the second handle section.

The handle forming members are adjustably and releasably secured in the blade clamping relation by a special latch shown as consisting of a lever 18, pivoted at 19, on the member 8, in position to engage beneath a flange 20, carried by an arcuate wall 21, struck up from the other member 7, said flange projecting through the arcuate slot 22, in member 8, when the two members are in the registered relation, Figs. 3, 4, 5 and 6.

The latch lever is shown as having a press button 23, struck up at the free end of the same and a small abutment is shown struck up at 24, at the lower end of the arcuate slot 22, to form a stop for limiting the clamping movement of the lever.

The handle forming plates are usually of metal possessed of a certain amount of resiliency and this spring quality is utilized for adjustably and yieldingly gripping the blade and for releasably retaining the lever in adjusted relation.

Fig. 5 shows how when a blade is gripped between the plates at the lower edge, the plates will come together at the upper edge and the intermediate portion of the plates will be more or less arched transversely under the squeezing action exerted by engagement of lever 18, beneath flange 20, and thus become a form of resilient truss yieldingly locking or holding the parts in such blade clamping relation and at the point of adjustment selected by the positioning of the clamp lever.

The structure is particularly simple, the blade is firmly held, but at the same time, can be readily removed, the blade holding studs and abutment flange are integral with one handle plate and the only attached part is the lever pivoted on the other plate and which has no tendency to become loose, because as shown in Fig. 6, the clamping pressure holds it to the plate on which it is mounted. The entire structure is thin and flat, as desirable, in devices of this nature. The inclined relation of the handle forming plates caused by the entry of the blade between the plates at one edge, enables the latch lever on one plate to operate with a wedging effect as it slides over the abutment surface carried by the other plate. As shown in Fig. 5, the abutment surface for the lever may be substantially parallel to the plate which carries it, the relatively inclined relation of the plates obviating any need for forming such surface as an inclined cam, the desired effect resulting from the inclined relation of the plates.

What is claimed is:

1. A furrier's knife, comprising handle forming plates pivotally connected at one end in superposed relation, integral tubular blade positioning studs struck up from one plate near the opposite end of the same, an integral abutment flange carried by said plate above said blade positioning studs, the other plate having a slot for passage of said abutment flange in the registered relation of the plates and a movable latch on said second plate engageable beneath said abutment flange when the latter is projected through said slot.

2. A furrier's knife, comprising handle forming plates pivotally connected at one end in superposed relation, integral tubular blade positioning studs struck up from one plate near the opposite end of the same, an integral abutment flange carried by said plate above said blade positioning studs, the other plate having a slot for passage of said abutment flange in the registered relation of the plates, a movable latch on said second plate engageable beneath said abutment flange when the latter is projected through said slot and comprising a lever pivoted on said second plate in position to swing beneath said abutment flange.

3. A furrier's knife, comprising handle forming plates pivotally connected at one end in superposed relation, integral tubular blade positioning studs struck up from one plate near the opposite end of the same, an integral abutment flange carried by said plate above said blade positioning studs, the other plate having a slot for passage of said abutment flange in the registered relation of the plates, a movable latch on said second plate engageable beneath said abutment flange when the latter is projected through said slot and comprising a lever pivoted on said second plate in position to swing beneath said abutment flange and an abutment struck up at one of said slot for limiting extent of movement of said latch lever.

4. A furrier's knife, comprising handle forming plates pivotally connected at one end in superposed relation, integral tubular blade positioning studs struck up from one plate near the opposite end of the same, an integral abutment flange carried by said plate above said blade positioning studs, the other plate having a slot for passage of said abutment flange in the registered relation of the plates, a movable latch on said second plate engageable beneath said abutment flange when the latter is projected through said slot, said second plate having openings registerable with and adapted to receive the ends of said tubular blade positioning studs.

5. A furrier's knife, comprising handle forming plates pivotally connected at one end and provided adjacent the opposite end with blade retaining means, a wall struck up from one plate at a point above said blade retaining means, an abutment flange carried by said wall, the other plate having a slot for passage of said struck up wall and abutment flange when the plates are in registered relation and a latch member mounted on said slotted plate in position for engagement beneath said abutment flange.

6. A furrier's knife, comprising handle forming plates pivotally connected at one end and provided adjacent the opposite end with blade retaining means, a wall struck up from one plate at a point above said blade retaining means, an abutment flange carried by said wall, the other plate having a slot for passage of said struck up wall and abutment flange when the plates are in registered relation, a latch member mounted on said slotted plate in position for engagement beneath said abutment flange, said latch member being in the form of a lever pivotally mounted on said slotted plate and the flange being of arcuate extent in substantial conformity with the swinging movement of said lever.

7. A furrier's knife, comprising handle forming plates having means at one edge cooperable in the superposed relation of the plates to hold a knife blade inserted between the plates at such edge, a knife blade entered between the knife forming plates at said edge and engaged by said blade holding means, said interposed blade maintaining the handle forming plates separated the thickness of said blade at said edge and said handle forming plates being directly engageable at the opposite edge to position said plates in transversely inclined relation, a movable latch element on one plate and a cooperable abutment element on the other plate, one of said plates having a slot therethrough positioned to pass the abutment element on the other plate when the two plates are registered in holding engagement with the interposed blade and said latch element then having a wedging engagement with said abutment element, because of said relatively inclined relation of said two handle forming plates.

8. A furrier's knife, comprising movably related substantially flat handle forming plates having means for cooperatively clamping and securing a blade between the same at one edge and said plates being directly engageable at the opposite edge in relatively inclined relation because of the separation effected by the interposed blade at the first mentioned edge, a swinging latch lever pivoted on one handle forming plate adjacent the second mentioned engaging edge of the handle forming plates, an abutment surface on the other handle carrying plate, substantially parallel to the same and in position to be engaged by the lever when the plates are in registered plate clamping relation, said lever and abutment surface constituting elements cooperating in the inclined relation of the plates to wedge the plates together into firm blade clamping relation and the plate carrying one of said elements having a slot therein to freely pass the cooperating element of the other handle carrying plate.

MAX INGWER.